(12) United States Patent
Wilson

(10) Patent No.: US 6,305,695 B1
(45) Date of Patent: Oct. 23, 2001

(54) GASKETS

(75) Inventor: Janet Kirsten Wilson, Glasgow (GB)

(73) Assignee: Federal-Mogul Technology Limited, Rugby (GB)

( * ) Notice: Subject to any disclaimer, the term of this patent is extended or adjusted under 35 U.S.C. 154(b) by 0 days.

(21) Appl. No.: 09/508,152

(22) PCT Filed: Aug. 19, 1998

(86) PCT No.: PCT/GB98/02485

§ 371 Date: May 30, 2000

§ 102(e) Date: May 30, 2000

(87) PCT Pub. No.: WO99/13249

PCT Pub. Date: Mar. 18, 1999

(30) Foreign Application Priority Data

Sep. 9, 1997 (GB) .................................................. 9718992

(51) Int. Cl.$^7$ ...................................................... F16J 15/02
(52) U.S. Cl. .................... 277/584; 277/612; 277/596; 277/644; 277/626
(58) Field of Search ................................. 277/584, 612, 277/596, 644, 626

(56) References Cited

U.S. PATENT DOCUMENTS

| 2,373,443 | * | 2/1945 | Armington | 277/644 |
|---|---|---|---|---|
| 2,513,178 | * | 6/1950 | Jackson | 277/596 |
| 2,995,057 | | 8/1961 | Nenzell | 85/9 |
| 3,930,656 | | 1/1976 | Jelinek | 277/180 |
| 4,321,225 | | 3/1982 | Jelinek | 264/138 |
| 4,635,949 | | 1/1987 | Lucas et al. | 277/235 B |
| 5,390,939 | * | 2/1995 | Terauchi et al. | 277/644 |

FOREIGN PATENT DOCUMENTS 0 330 126   8/1989   (EP) .................................. F02F/11/00

* cited by examiner

Primary Examiner—Lynne H. Browne
Assistant Examiner—Enoch Peavey
(74) Attorney, Agent, or Firm—Synnestvedt & Lechner LLP

(57) ABSTRACT

A gasket (40) has a trough (44) in a supporting sheet (42) thereof. The trough has a bead (52) mounted therein. Said bead has a transverse cross section defined by lower (56) and side (58) surfaces which conform to and engage bounding surfaces of the trough, and also defined by an upper surface (60) which, in an uncompressed state of the bead, defines a projection (54) extending out of the trough. The surface (60) also defines a recess (62) extending parallel to said projection, the recess being formed within said trough. Said projection (54) is positioned on one side of the longitudinal center-line (70) of the bead (52) and said recess (62) is positioned on the other side of said center-line.

3 Claims, 2 Drawing Sheets

GASKETS

This invention is concerned with gaskets, for example of the type which are used to create seals between the blocks and the heads of internal combustion engines.

Gaskets for use in, for example, automotive applications often comprise a supporting sheet, eg of steel, on one or both surfaces of which elongated beads are adhered. Such beads are made, eg by extrusion, from resilient material, eg elastomeric material, and are arranged to be compressed to create a seal between the supporting sheet and a surface of an adjacent member, eg a block or a head. The beads extend around continuous closed paths around openings through the gasket, for example the closed path may extend around the periphery of the gasket or, in the case of a head gasket, around the engine cylinders, oil passages, coolant passages or bolt holes.

The elongated resilient beads used in gaskets have a constant transverse cross-sectional shape along the bead, when the bead is in an uncompressed state. This cross-sectional shape is designed to ensure a good seal. However, where the bead is adhered to an upper surface of the supporting sheet, compression of the bead can cause great deformation thereof. This great deformation can cause the bead to be damaged or a bottom surface thereof may be torn off the supporting sheet with the result that the bead may be moved from its intended position.

It is known to reduce the deformation of a bead by forming a trough (or track) in the supporting sheet. The trough opens through a surface of the sheet, ie the upper or the lower surface of the supporting sheet. The trough has a substantially constant transverse cross-section, which may be rectangular or have tapering sides. The trough extends around the continuous closed path and the bead is mounted in the trough with a projection thereof extending out of the trough beyond the upper surface of the sheet so that the projection can be compressed to form a continuous seal along said path, the projection being arranged centrally of the trough. An example is illustrated in FR 2,411,688 A. It is also known, eg from U.S. Pat. No. 3,930,656, to provide the bead with two recesses, one on either side of the central projection as shown in FIGS. 1 and 2 described below. The recesses extend parallel to said projection and are formed within said trough. An example of such a gasket is also described below in relation to FIGS. 1 and 2. The recesses are provided so that the bead material can be displaced into the recesses during compression of the bead. However, it is found in practice that the displacement of the bead material in two opposite directions results in creases occurring in the material with a consequential risk of damage to the bead.

It is an object of the present invention to provide a gasket having a bead with a reduced risk of damage.

The invention provides a gasket comprising a generally planar supporting sheet, the supporting sheet having a trough formed therein, the trough opening through an upper surface of the sheet and having a substantially constant transverse cross-section, the trough extending around a continuous closed path around an opening through the gasket, the gasket also comprising an elongated bead made of resilient material and having a substantially constant transverse cross-section, the bead being mounted in said trough and extending around said path, the bead comprising a projection which, in an uncompressed state of the bead, projects out of the trough beyond the upper surface of the sheet so that the projection can be compressed to form a continuous seal along said path, characterised in that said bead has a transverse cross-section defined by lower and side surfaces which conform to and engage bounding surfaces of the trough, and also defined by an upper surface which, in an uncompressed state of the bead, defines said projection and a recess extending parallel to said projection, the recess being formed within said trough, said projection being positioned on one side of the longitudinal centre-line of the bead and said recess being positioned on the other side of said centre-line.

In a gasket in accordance with the invention, the material of the bead forming the projection is displaced in only one direction and this is found to reduce creasing and hence the risk of damage to the bead.

In a gasket according to the invention, the transverse cross-sectional area of the recess may be substantially equal to the transverse cross-sectional area of the projection. This ensures that there is sufficient space for the displaced material to occupy even if the bead is compressed to the level of the upper surface of the supporting sheet.

Preferably, the projection has a side surface which is continuous with a side surface of the recess, ie the recess merges with the projection and the recess is appropriately positioned to receive the displaced material.

Preferably, for ease of manufacture of the bead, the upper surface of the bead also has planar portions joining the projection to one edge of the opening of the trough and also joining the recess to the other edge of the opening.

There now follow detailed descriptions, to be read with reference to the accompanying drawings, of a prior art gasket and of an illustrative gasket in accordance with the invention.

Figure 1:
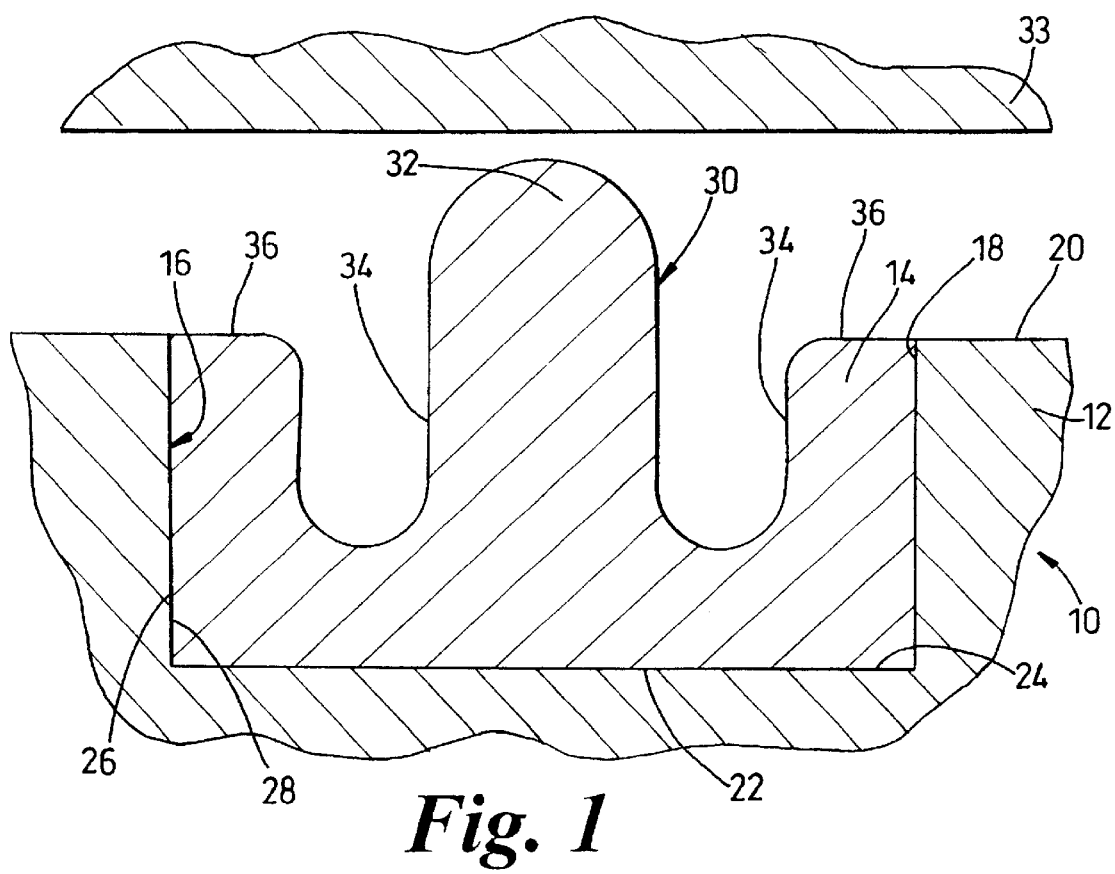
FIG. 1 is a cross-sectional view, on a greatly enlarged scale, taken through a portion of the prior art gasket, showing its bead in an uncompressed state.
Figure 2:
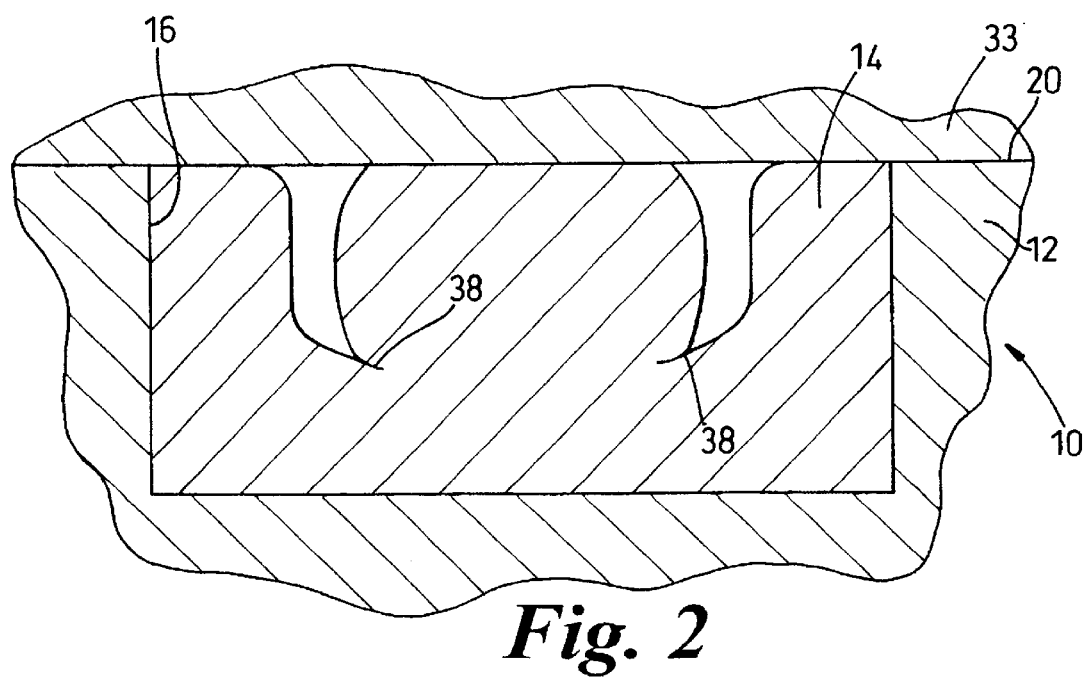
FIG. 2 is a view similar to FIG. 1 but showing the bead in a compressed state.

The prior art gasket 10 shown in FIGS. 1 and 2 comprises a supporting sheet 12 made of steel and a bead 14 which is made of resilient material. The bead 14 is mounted in a trough 16 defined by the sheet 12. The trough 16 has a constant rectangular transverse cross-section and has an opening 18 through an upper surface 20 of the sheet 12. The trough 16 extends around a continuous closed path (not shown) around an opening through the gasket.

Specifically, the bead 14 is an extrusion of elastomeric material and, when in the uncompressed state in which it is shown in FIG. 1, has a transverse cross-sectional shape which is substantially constant along the length of the bead. This cross-sectional shape is defined by a substantially planar bottom surface 22 which is adhered to the bottom surface 24 of the trough 16, by two substantially planar side surfaces 26 which extend normally to the surface 24 and engage side surfaces 28 of the trough 16, and by an upper surface 30 which extends between the side surfaces 26 of the bead across the opening 18 of the trough 16. The upper surface 30 defines a central projection 32 of the bead 14 which extends out of the trough 16 through the opening 18 and beyond the upper surface 20 of the sheet 12. The projection 32 is arranged to be compressed by a head 33 from the condition shown in FIG. 1 to the condition shown in FIG. 2 in order to form a continuous seal around the path followed by the trough 16. On each side of the projection 32, the upper surface 30 defines a recess 34 into which material of the projection 32 is displaced during compression of the bead 14. The upper surface 30 also defines planar surface portions 36 which are flush with the upper surface 20 of the sheet 12 and extend from the recesses 34 to the edges of the opening 18.

A comparison of FIG. 2 with FIG. 1 reveals that, in moving from its uncompressed state to its compressed state, the material of the bead 14 is deformed very considerably. In particular, in its compressed state, shown in FIG. 2, the material of the bead 14 exhibits creases 38.

Figure 3:
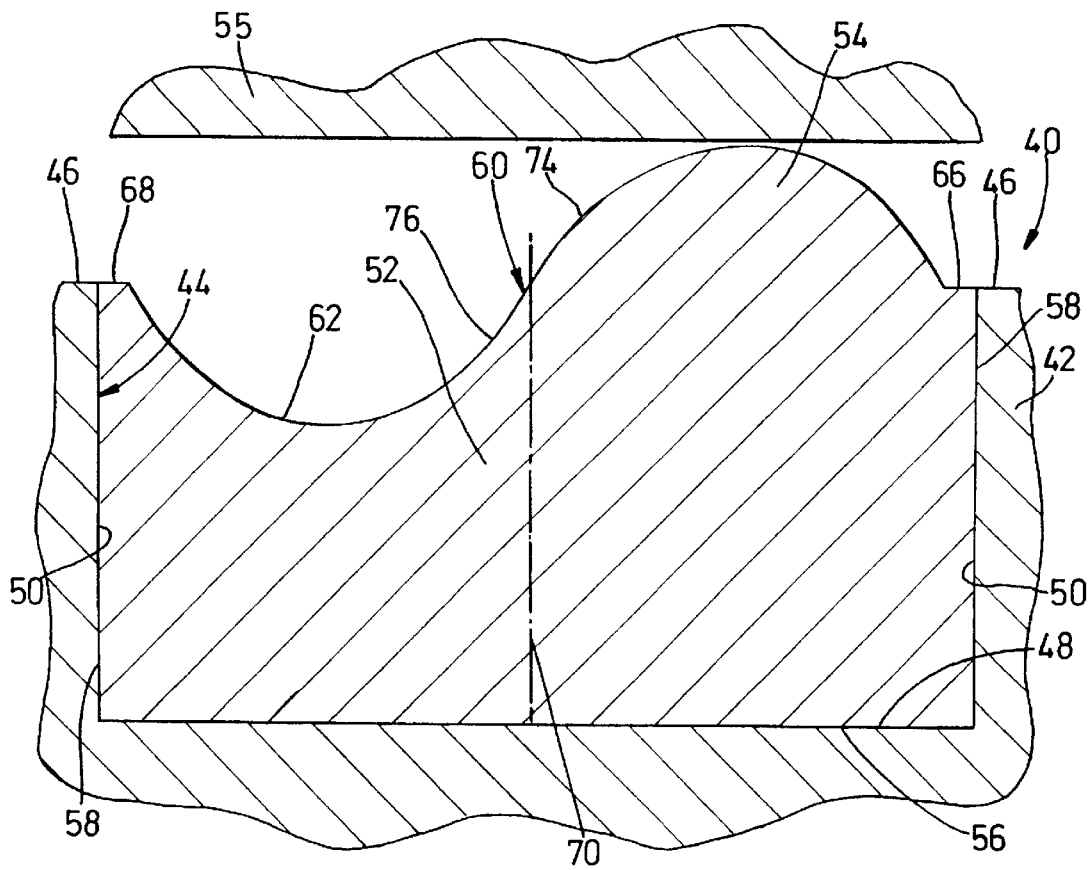
FIGS. 3 and 4 are views similar to FIGS. 1 and 2, respectively, but taken through the illustrative gasket.
Figure 4:
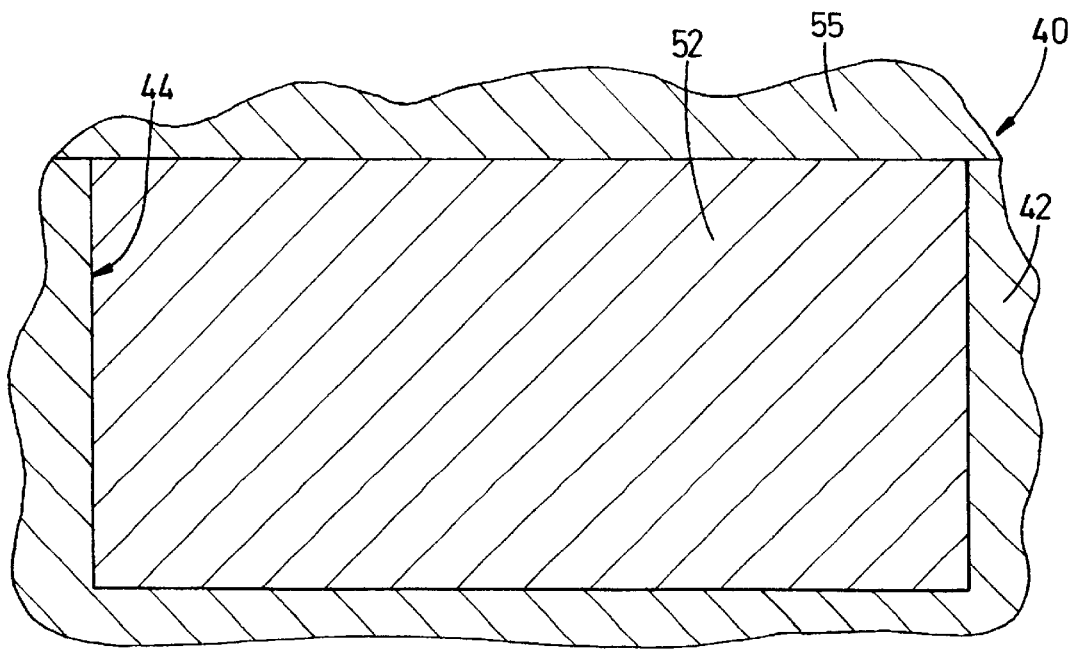

The illustrative gasket 40 is shown in FIGS. 3 and 4. The gasket 40 comprises a generally planar supporting sheet 42 made of steel. The supporting sheet 42 has a trough 44 similar to the trough 16 formed therein, the trough 44 opening through an upper surface 46 of the sheet 42 and having a substantially constant transverse cross-section which is rectangular and is bounded by a bottom surface 48 and two side surfaces 50. The trough 44 extends around a continuous closed path (not shown) around an opening through the gasket.

The gasket 40 also comprises an elongated bead 52 made of resilient material and having a substantially constant transverse cross-section. The bead 52 is mounted in said trough 44 and extends around said path. The bead 52 comprises a projection 54 which, in an uncompressed state of the bead, projects out of the trough 44 beyond the upper surface 46 of the sheet 42 so that the projection 54 can be compressed by a head 55 to form a continuous seal along said path.

The bead 52 has a transverse cross-section defined by a lower surface 56 which conforms to and engages the bottom surface 48 of the trough 44. The bead 52 is also defined by two side surfaces 58 which conform to and engage the side surfaces 50 of the trough 44. The bead 52 is also defined by an upper surface 60 which, in an uncompressed state of the bead, defines said projection 54 and a recess 62 extending parallel to said projection.

The projection 54 is domed and projects out of the opening of the trough 44 above the upper surface 46 of the sheet 42. The recess 62 is formed within said trough 44, ie the recess is below the level of the upper surface 46 of the sheet 44. The recess 62 has a transverse cross-sectional area which is substantially equal to that of the projection 54. Indeed, the recess 62 is formed in the same shape as the projection 54 but inverted, ie the projection 54 could be fitted into the recess 62. The upper surface 60 forms a continuous curve in passing from the projection 54 into the recess 62, ie there are no steps in the surface 60 between the projection 54 and the recess 62. The upper surface 60 also has planar portions 66 and 68 which, respectively join the projection 54 to one edge of the opening of the trough 44, and the recess 62 to the other edge of said opening.

As can be seen from FIG. 3, the projection 54 is positioned on one side of the longitudinal centre-line 70 of the bead 52 and said recess 62 is positioned on the other side of said centre-line. In other words, the bead is asymmetrical with the projection 54 nearer to one edge of the opening of the trough 44 than to the other edge thereof. Furthermore, the projection 54 has a recess on one side thereof only. As can also be seen from FIG. 3, the projection 54 has a side surface 74 which is continuous with a side surface 76 of the recess 62, the surfaces 74 and 76 meeting on the centre-line 70.

A comparison of FIG. 3 with FIG. 4 shows that, in its compressed state, the bead 52 substantially fills the trough 44, the material forming the projection 54 having been displaced into the recess 62 without creasing occurring.

Since it frequently occurs that a gasket should seal at the same place on both sides of its supporting sheet, a gasket according to the invention may incorporate a further trough in the lower surface of its supporting sheet and a further bead (similar to the bead 52) in said further trough. The further trough following the same path as the trough 44 but on the other side of the sheet 42. If desired, there may be communication holes through the sheet 42 so that the bead 52 and said further bead can be integral with one another.

What is claimed is:

1. A gasket comprising a generally planar supporting sheet, the supporting sheet having a trough formed therein, the trough opening through upper surface of the sheet and having a substantially constant transverse cross-section, the trough extending around a continuous closed path around an opening through the gasket, the gasket also comprising an elongated bead made of resilient material and having a substantially constant transverse cross-section, the bead being mounted in said trough and extending around said path, the bead comprising a projection which, in an uncompressed state of the bead, projects out of the trough beyond the upper surface of the sheet so that the projection can be compressed to form a continuous seal along said path, wherein said bead has a transverse cross-section defined by lower and side surfaces which conform to and engage bounding surfaces of the trough, and also defined by an upper surface which, in an uncompressed state of the bead, defines said projection and a recess extending parallel to said projection, the recess being formed within said trough, said projection being positioned on one side of the longitudinal centre-line of the bead and said recess being positioned on the other side of said centre-line, the projection having a side surface which is continuous with a side surface and with the bottom of the recess, the projection and the recess both being dome-shaped.

2. A gasket according to claim 1, wherein the transverse cross-sectional area of the recess is substantially equal to the transverse cross-sectional area of the projection.

3. A gasket according to claim 1, wherein the upper surface of the bead also has planar portions joining the projection to one edge of the opening of the trough and also joining the recess to the other edge of the opening.

* * * * *